US012055139B2

(12) United States Patent
Roberts et al.

(10) Patent No.: US 12,055,139 B2
(45) Date of Patent: Aug. 6, 2024

(54) MICRO-NUTATING PUMP ASSEMBLY

(71) Applicant: The Coca-Cola Company, Atlanta, GA (US)

(72) Inventors: Jevawn Sebastian Roberts, Tucker, GA (US); Eric Thomas Flint, Waleska, GA (US); Luke Anthony Smith, Atlanta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 99 days.

(21) Appl. No.: 17/624,737

(22) PCT Filed: Jan. 6, 2021

(86) PCT No.: PCT/US2021/012322

§ 371 (c)(1),
(2) Date: Jan. 4, 2022

(87) PCT Pub. No.: WO2021/141997

PCT Pub. Date: Jul. 15, 2021

(65) Prior Publication Data

US 2022/0333584 A1 Oct. 20, 2022

(51) Int. Cl.
*F04B 7/06* (2006.01)
*B67D 1/10* (2006.01)

(52) U.S. Cl.
CPC ................ *F04B 7/06* (2013.01); *B67D 1/102* (2013.01)

(58) Field of Classification Search
CPC .................................. F04B 7/06; B67D 1/102
See application file for complete search history.

(56) References Cited

U.S. PATENT DOCUMENTS

| | | | | |
|---|---|---|---|---|
| 7,648,349 B2 * | 1/2010 | Hogan | F04B 11/0075 417/500 |
| 7,946,832 B2 * | 5/2011 | Hogan | F04B 13/02 417/500 |
| 9,057,363 B2 * | 6/2015 | Capone | F04B 53/10 |
| 9,440,836 B2 | 9/2016 | Quittner et al. | |
| 9,784,255 B2 * | 10/2017 | Hogan | F04B 7/06 |
| 2006/0037971 A1 * | 2/2006 | Minard | F04B 13/02 222/145.5 |
| 2007/0196223 A1 * | 8/2007 | Hogan | F04B 7/06 417/500 |
| 2008/0304993 A1 | 12/2008 | Lynn et al. | |
| 2008/0310969 A1 * | 12/2008 | Hogan | F04B 7/06 417/63 |
| 2009/0097998 A1 | 4/2009 | Hughes | |

(Continued)

FOREIGN PATENT DOCUMENTS

WO 2018/204240 A1 11/2018

OTHER PUBLICATIONS

International Search Report and Written Opinion, PCT/US2021/012322, Apr. 29, 2021 (10 pp.).

*Primary Examiner* — Bob Zadeh
*Assistant Examiner* — Michael J. Melaragno
(74) *Attorney, Agent, or Firm* — Eversheds Sutherland (US) LLP

(57) ABSTRACT

The present application provides a nutating pump assembly for pumping a fluid. The nutating pump assembly may include a nutating pump and an air vent chamber assembly in fluid communication with the nutating pump.

18 Claims, 12 Drawing Sheets

(56) References Cited

U.S. PATENT DOCUMENTS

| | | | | |
|---|---|---|---|---|
| 2010/0143161 | A1* | 6/2010 | Hogan | F04B 7/06 417/500 |
| 2015/0097003 | A1 | 4/2015 | Tavolazzi | |
| 2015/0248133 | A1 | 9/2015 | Minard et al. | |
| 2016/0153433 | A1 | 6/2016 | Hogan | |
| 2018/0044161 | A1 | 2/2018 | Moore et al. | |
| 2022/0333584 | A1* | 10/2022 | Roberts | F04B 53/06 |

* cited by examiner

MICRO-NUTATING PUMP ASSEMBLY

TECHNICAL FIELD

The present application and the resultant patent relate generally to nutating pumps and more particularly relate to a micro-nutating pump assembly for accurately dispensing highly concentrated fluids and the like in beverage dispensers and other types of applications.

BACKGROUND OF THE INVENTION

Recent improvements in beverage dispensing technology have focused on the use of micro-ingredients. With micro-ingredients, the traditional beverage bases are separated into their constituent parts at much higher dilution or reconstitution ratios. For example, the "COCA-COLA FREESTYLE®" refrigerated beverage dispensing units offered by The Coca-Cola Company of Atlanta, Georgia provide a significant increase in the number and types of beverages that may be offered by a beverage dispenser of a conventional size or footprint. Generally described, the "COCA-COLA FREESTYLE®" refrigerated beverage dispensing units create a beverage by combining a number of highly concentrated micro-ingredients with a macro-ingredient such as a sweetener and a diluent such as still or carbonated water. The micro-ingredients generally are stored in cartridges positioned within or adjacent to the beverage dispenser itself. The number and type of beverages offered by the beverage dispenser thus may be limited only by the number and type of micro-ingredient cartridges positioned therein.

The highly concentrated nature of the micro-ingredients has presented certain issues in use. For example, a beverage circuit may need to be primed when changing out a micro-ingredient cartridge. Such priming may take time and result in an amount of wasted product. Likewise, evacuating the last remnants of product in a micro-ingredient cartridge may be difficult and, again, may result is a certain amount of wasted product.

There is thus a desire for an improved dispensing system and the like that can accommodate the dispensing of micro-ingredients in an efficient manner with limited product loss.

SUMMARY OF THE INVENTION

The present application and the resultant patent thus provide a nutating pump assembly for pumping a fluid. The nutating pump assembly may include a nutating pump and an air vent chamber assembly in fluid communication with the nutating pump.

The present application and the resultant patent further may provide a method of pumping a fluid from a container to a nozzle. The method may include the steps of pumping the fluid by a nutating pump from the container to an air vent chamber assembly, storing the fluid within the air vent chamber assembly, pumping the fluid by the nutating pump from the air vent chamber to the nozzle, and pumping more fluid by the nutating pump from the container to the air vent chamber assembly when the air vent chamber assembly is substantially empty.

The present application and the resultant patent further may provide a beverage dispensing system for dispensing a fluid. The beverage dispenser system may include a fluid container, a nutating pump, an air vent chamber assembly, and a nozzle. The nutating pump pumps the fluid from the fluid container to the air vent chamber assembly and from the air vent chamber assembly to the nozzle.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
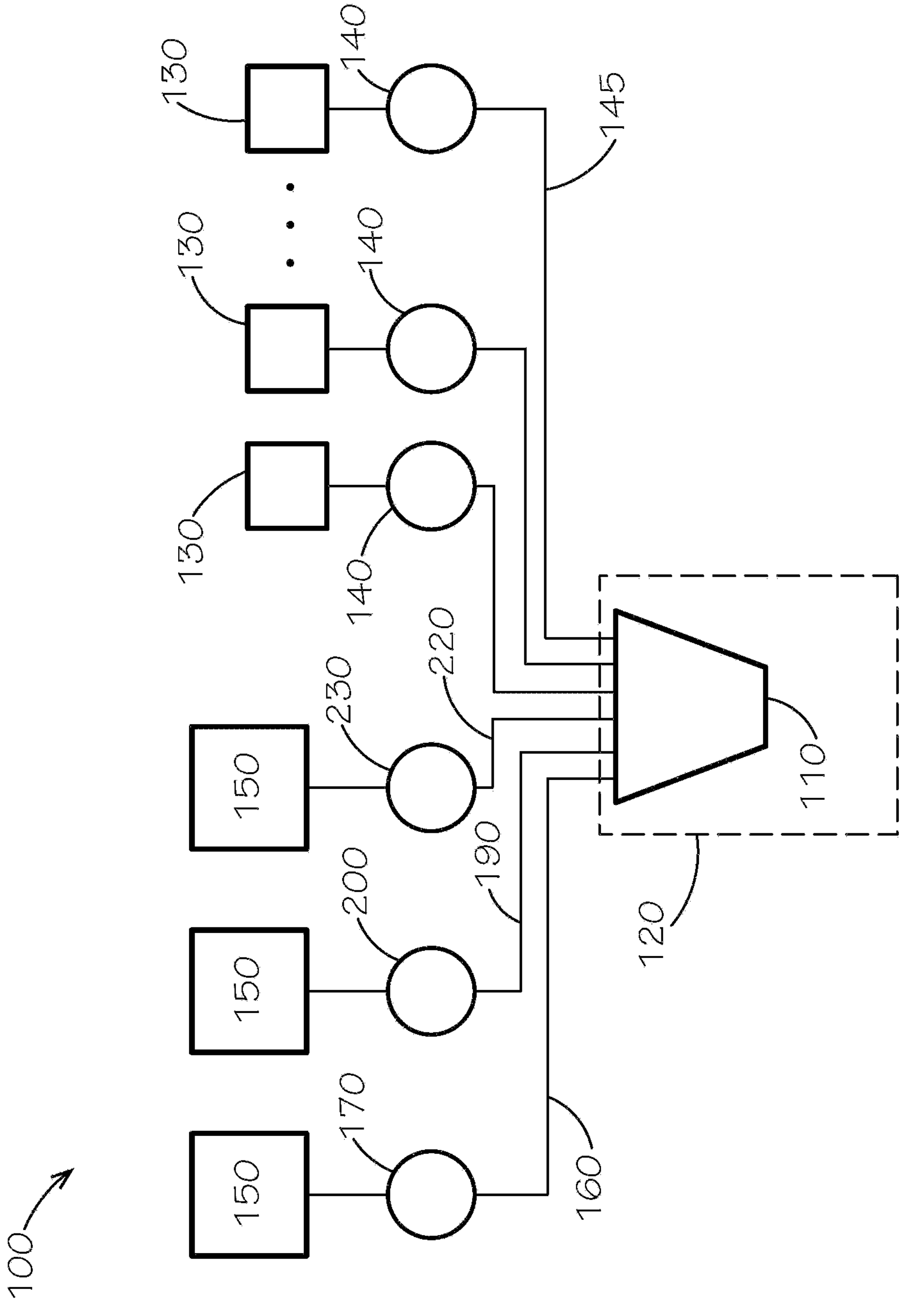
FIG. 1 is a schematic diagram of an example beverage dispensing system.

Referring now to the drawings, in which like numerals refer to like elements throughout the several views, FIG. 1 shows an example of a beverage dispensing system 100 as may be described herein. The beverage dispensing system 100 may be used for dispensing many different types of beverages or other types of fluids. Specifically, the beverage dispensing system 100 may be used with diluents, macro-ingredients, micro-ingredients, and other types of fluids. The diluents generally include plain water (still water or non-carbonated water), carbonated water, and other fluids. Any type of fluid may be used herein.

Generally described, the macro-ingredients may have reconstitution ratios in the range from full strength (no dilution) to about six (6) to one (1) (but generally less than about ten (10) to one (1)). The macro-ingredients may include sugar syrup, HFCS ("High Fructose Corn Syrup"), concentrated extracts, purees, and similar types of ingredients. Other ingredients may include dairy products, soy, and rice concentrates. Similarly, a macro-ingredient base product may include the sweetener as well as flavorings, acids, and other common components as a beverage syrup. The beverage syrup with sugar, HFCS, or other macro-ingredient base products generally may be stored in a conventional bag-in-box container remote from the beverage dispenser. The viscosity of the macro-ingredients may range from about 1 to about 10,000 centipoise and generally over 100 centipoises when chilled. Other types of macro-ingredients and the like may be used herein.

The micro-ingredients may have reconstitution ratios ranging from about ten (10) to one (1) and higher. Specifically, many micro-ingredients may have reconstitution ratios in the range of about 20:1, to 50:1, to 100:1, to 300:1, or higher. The viscosities of the micro-ingredients typically range from about one (1) to about six (6) centipoise or so, but may vary from this range. Examples of micro-ingredients include natural or artificial flavors; flavor additives; natural or artificial colors; artificial sweeteners (high potency, nonnutritive, or otherwise); antifoam agents, non-nutritive ingredients, additives for controlling tartness, e.g., citric acid or potassium citrate; functional additives such as vitamins, minerals, herbal extracts, nutraceuticals; and over the counter (or otherwise) medicines such as turmeric, acetaminophen; and similar types of ingredients. Various types of alcohols may be used as either macro- or micro-ingredients. The micro-ingredients may be in liquid, gaseous, or powder form (and/or combinations thereof including soluble and suspended ingredients in a variety of media, including water, organic solvents, and oils). Other types of micro-ingredients may be used herein.

The various fluids used herein may be mixed in or about a dispensing nozzle 110. The dispensing nozzle 110 may be a conventional multi-flavor nozzle and the like. The dispensing nozzle 110 may have any suitable size, shape, or configuration. The dispensing nozzle 110 may be positioned within a dispensing tower 120. The dispensing tower 120 made have any suitable size, shape, or configuration. The dispensing tower 120 may extend from a countertop and the like and/or the dispensing tower 120 may be a free-standing structure. The dispensing tower 120 may have a number of the dispensing nozzles 110 thereon.

The micro-ingredients may be stored in a number of micro-ingredient containers 130 or other types of micro-ingredient sources. The micro-ingredient containers 130 may have any suitable size, shape, or configuration. Any number of the micro-ingredient containers 130 may be used herein. The micro-ingredient containers 130 may be in communication with the dispensing nozzle 110 via a number of micro-ingredient pumps 140 positioned on a number of micro-ingredient conduits 145. The micro-ingredient pumps 140 will be described in more detail below and made have any suitable volume or capacity. The micro-ingredient containers 130 may be positioned in, adjacent to, and/or remote from the dispensing nozzle 110. For example, the micro-ingredient containers 130 may be positioned under the counter top upon which the dispensing tower 120 rests. Some or all of the micro-ingredient containers 130 may be agitated.

A still water source 150 may be in communication with the dispensing nozzle 110 via a still water conduit 160. Other types of diluents may be used herein. Still water or other types of diluents may be pumped to the dispensing nozzle 110 via a still water pump 170. The still water pump 170 may be may be any type of conventional fluid moving device and made have any suitable volume or capacity. Alternatively, the pressure in a conventional municipal water source may be sufficient without the use of a pump. Any number of still water sources 150 may be used herein.

A carbonated water source 180 may be in communication with the dispensing nozzle 110 via a carbonated water conduit 190. The carbonated water source 180 may be a conventional carbonator and the like. The carbonator may have any suitable size, shape, or configuration. Carbonated water or other types of diluents may be pumped to the dispensing nozzle 110 via a carbonated water pump 200. The carbonated water pump 200 may be any type of conventional fluid moving device and made have any suitable volume or capacity. Any number of carbonated water sources 180 may be used herein. A carbonated water recirculation line also may be used herein.

One or more macro-ingredient sources 210 may be in communication with the dispensing nozzle 110 via one or more macro-ingredient conduits 220. As described above, the macro-ingredient sources 210 may include sweeteners such as high fructose corn syrup, sugar solutions, and the like. The macro-ingredient sources 210 may be a conventional bag-in-box or other type of container in any suitable size, shape, or configuration. Any number of the macro-ingredient sources 210 may be used herein. The macro-ingredients may flow to the dispensing nozzle 110 via a macro-ingredient pump 230. In this case, the macro-ingredient pump 230 may be a controlled gear pump and the like. Other types of pumps may be used herein.

Operation of the beverage dispensing system 100 and the component therein may be controlled by a control device 240. The control device 240 may be a conventional microcomputer and the like capable of executing programmable commands. The control device 240 may be internal or external from the beverage dispensing system 100. The functionality of the control device 240 may be implemented in software, firmware, hardware, or any combination thereof. One control device 240 may control multiple beverage dispensing systems 100 and/or one beverage dispensing system 100 may have multiple control devices 240 with specific tasks.

Figure 2:
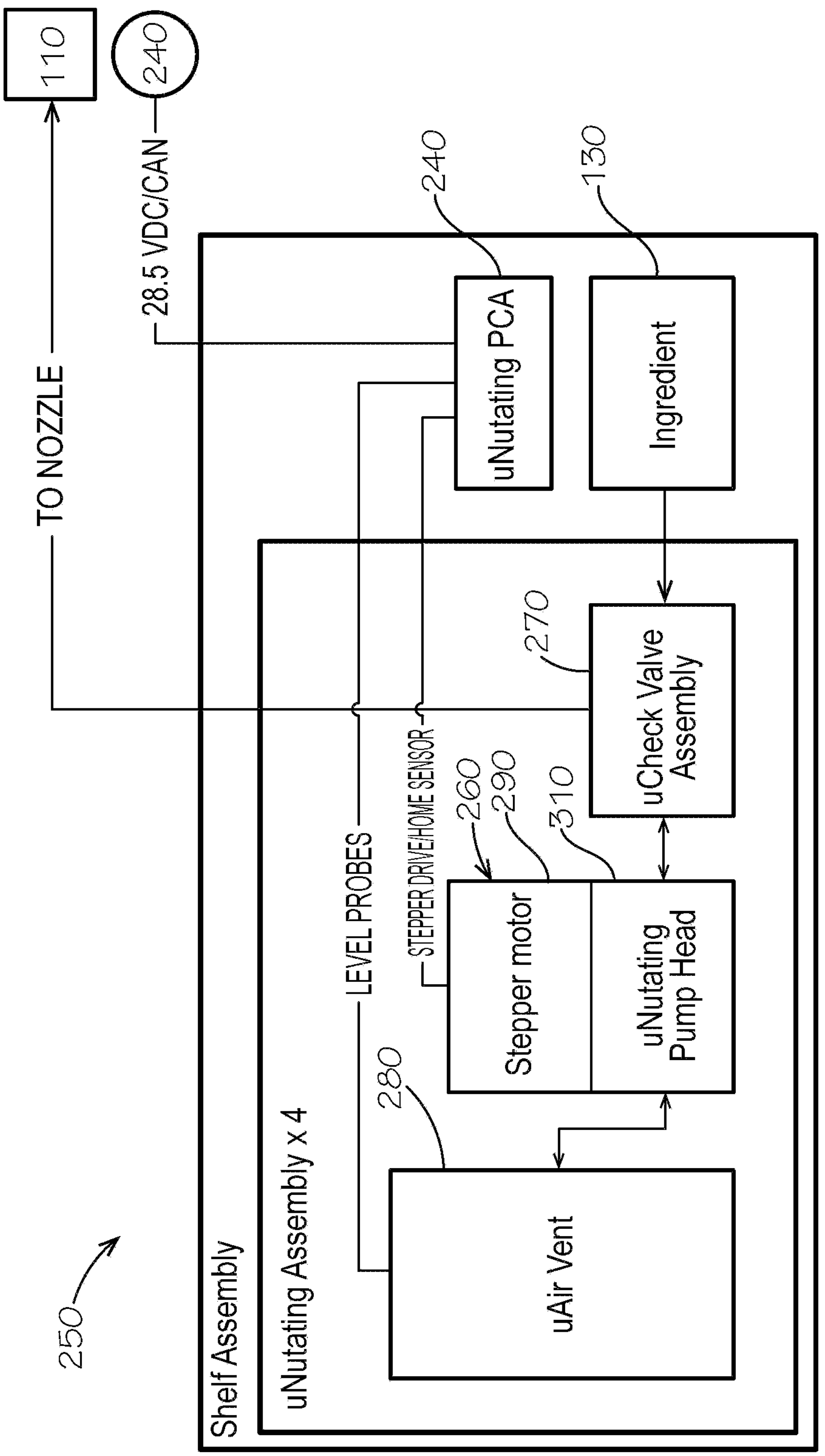
FIG. 2 is a schematic diagram of a micro-nutating pump assembly as may be described herein.
Figure 3:
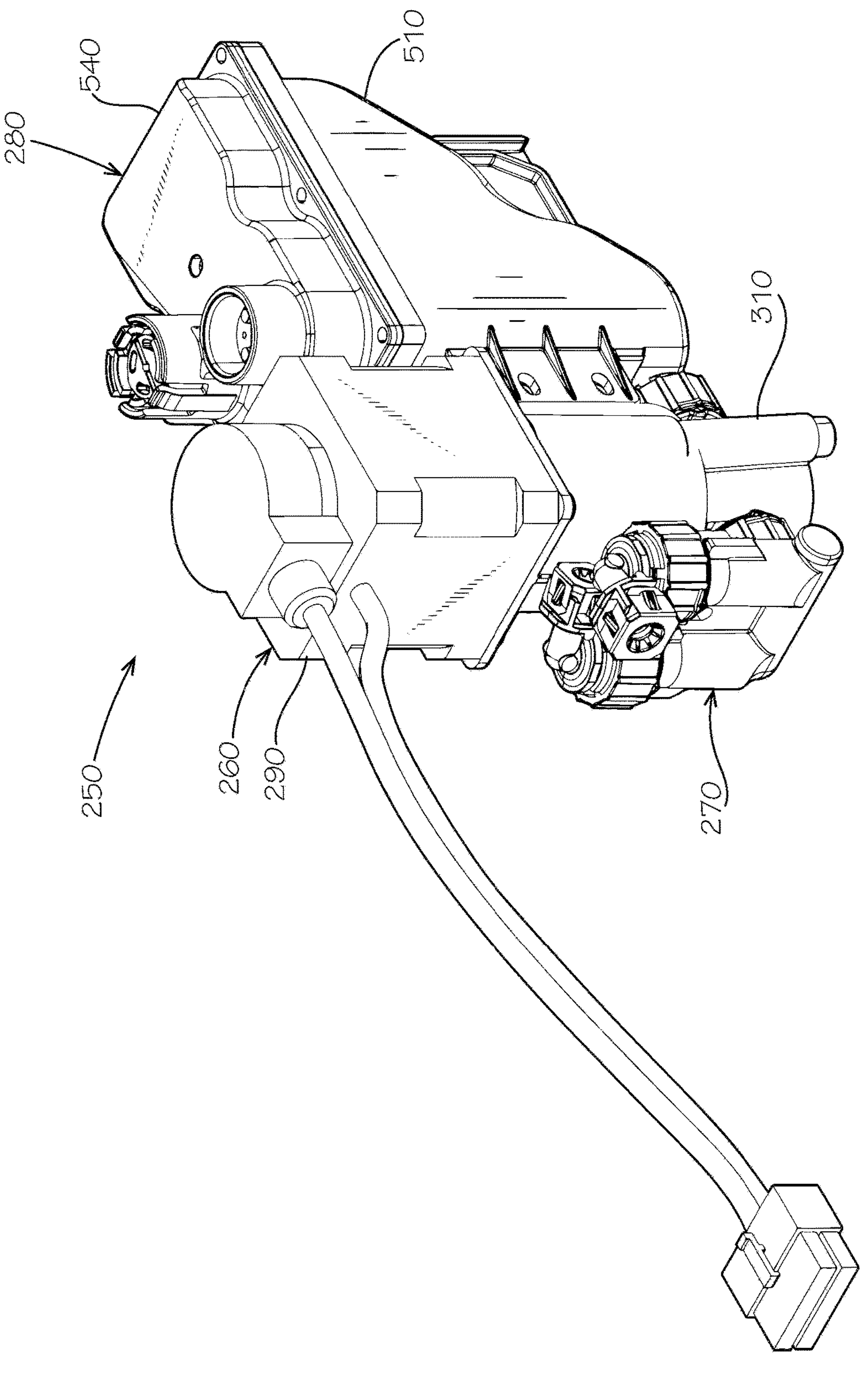
FIG. 3 is a perspective view of the micro-nutating pump assembly of FIG. 2.

FIG. 2 shows a block diagram of an example of a micro-ingredient pump 140 in the form of a micro-nutating pump assembly 250. FIG. 3 shows a perspective view thereof. Each micro-nutating pump assembly 250 may be in communication with a micro-ingredient container 130 on one end and the nozzle 110 on the other. Operation of the micro-nutating pump assemblies 250 may be controlled by the control device 240. Any number of the micro-nutating pump assemblies 250 may be used herein. The micro-nutating pump assembly 250 may include a nutating pump 260, a check valve assembly 270, and an air vent chamber assembly 280. Other components and other configurations may be used herein.

Figure 4:
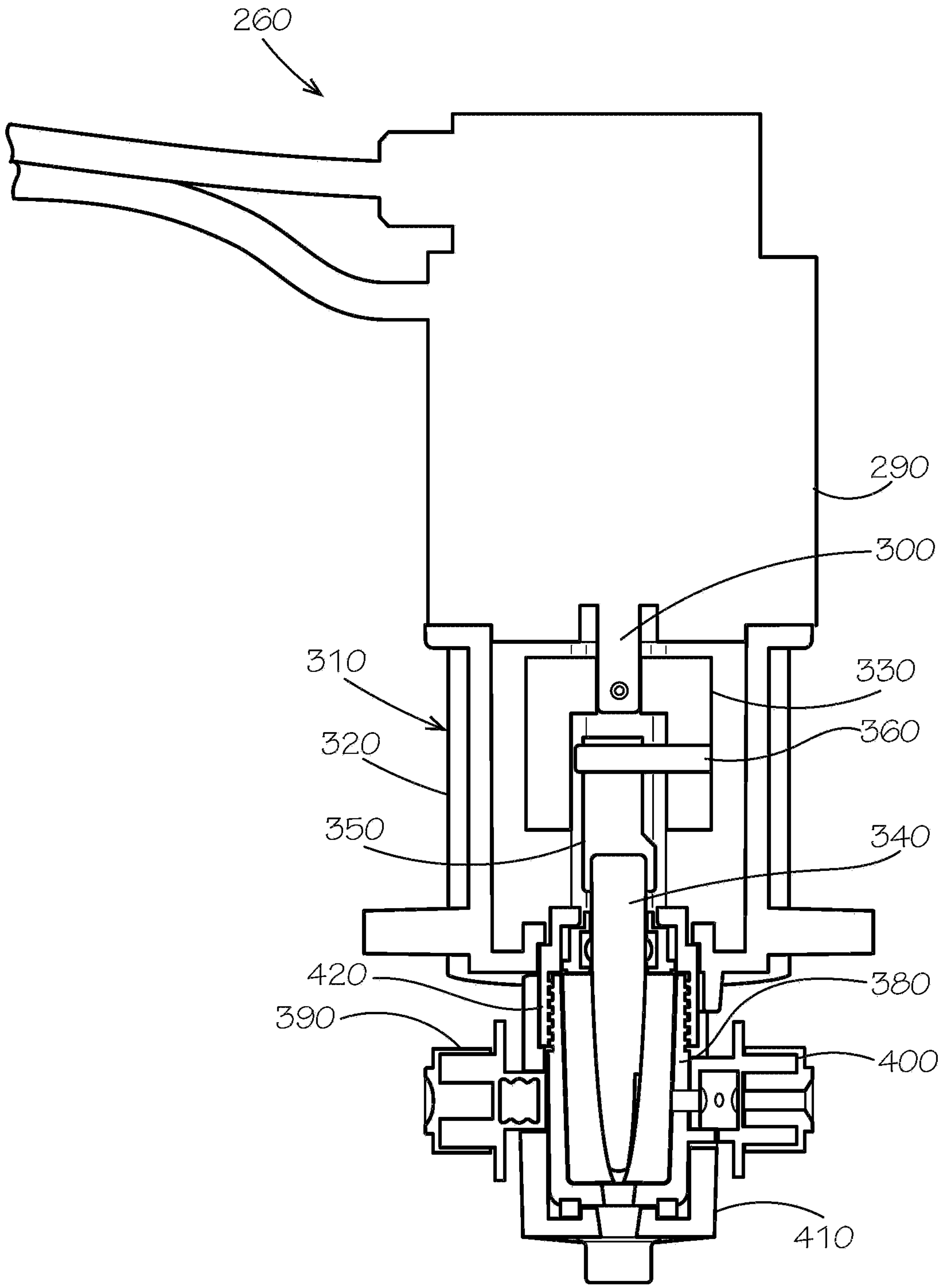
FIG. 4 is a cross-sectional view of a nutating pump of the micro-nutating pump assembly of FIG. 2.
Figure 5:
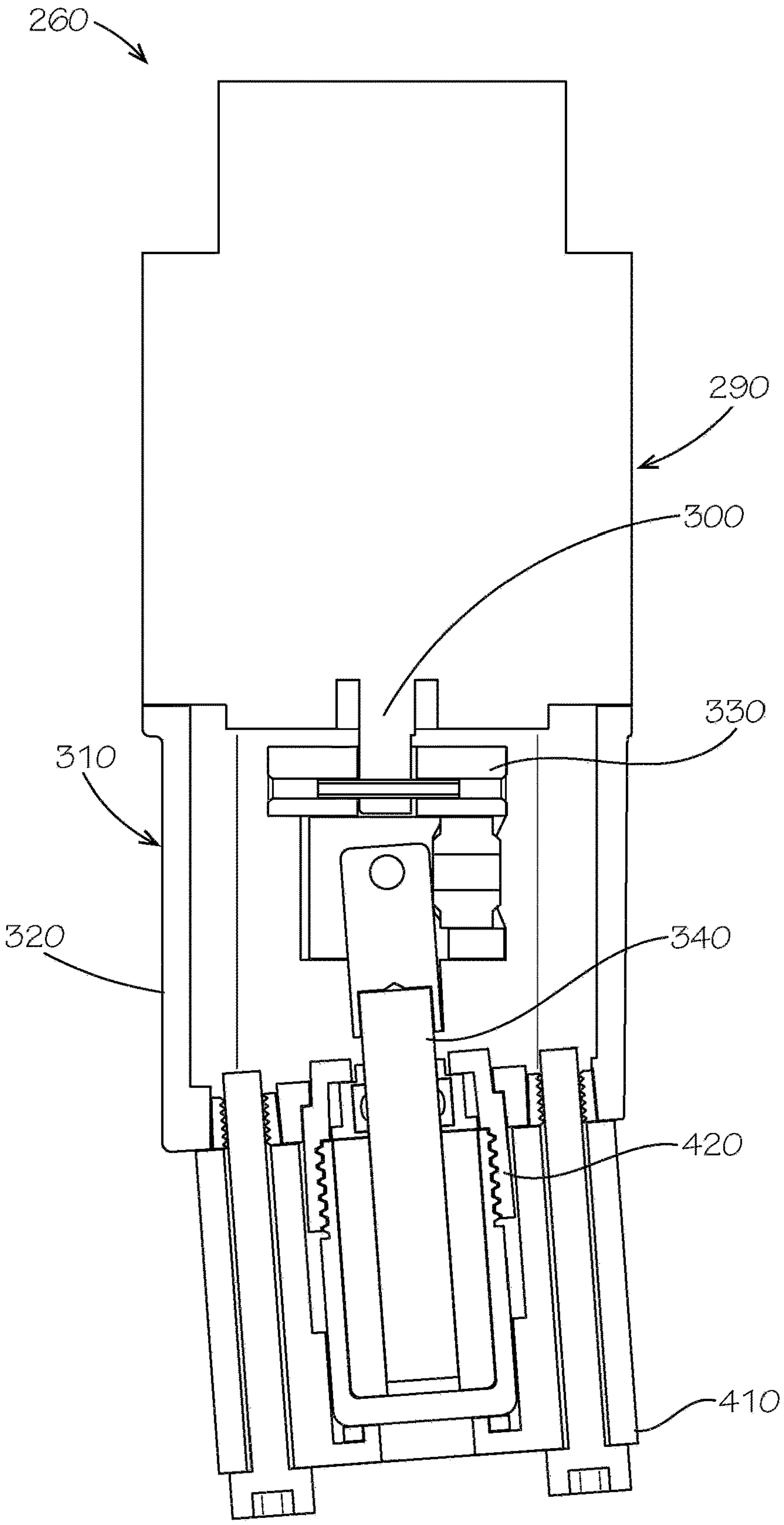
FIG. 5 is a further cross-sectional view of the nutating pump of FIG. 4.
Figure 6:
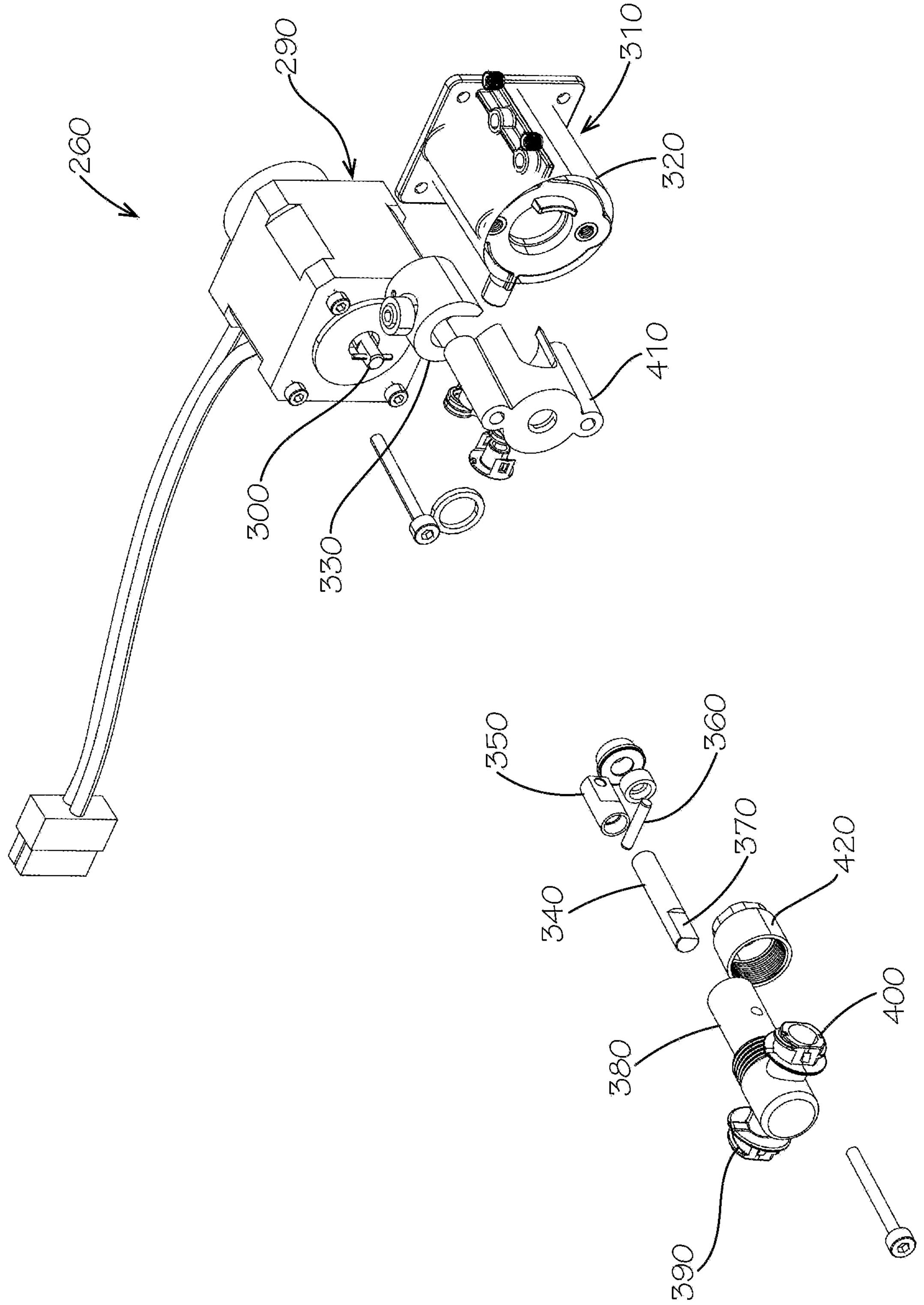
FIG. 6 is an exploded view of the nutating pump of FIG. 4.

FIGS. 4-6 show an example of the nutating pump 260. Generally described, a nutating pump includes a piston that may rotate about its axis and also may slide axially and reciprocally. The rotation and/or reciprocal motion creates a generally sinusoidal or trapezoidal dispense profile. The nutating pump 260 may include a drive motor 290. The drive motor 290 may be a conventional stepper motor, a brushless DC motor, and the like with high accuracy and high torque. The stepper motor may include a home sensor or other type of position sensor. The drive motor 290 may be reversible. The drive motor 290 may be in communication with the control device 240. The drive motor 290 may have a drive shaft 300 extending therefrom. Other components and other configurations may be used herein.

The nutating pump 260 also may include a nutating pump head 310. The nutating pump head 310 may have a pump head housing 320. The pump head housing 320 may be bolted or otherwise attached to the drive motor 290. The drive shaft 300 of the drive motor 290 may be attached to a wobble plate or an adjustable coupling 330 within the pump head housing 320. A piston 340 may be attached to the adjustable coupling 330 via a sleeve 350 and a pin 360 for rotation therewith. Other types of connection devices may be used herein. The piston 340 may have a machined flat area 370 on one end thereof to provide the pumping action upon rotation. The dimensions of the piston 340 and the flat area 370 may vary.

The piston 340 may rotate within a pump chamber 380. The pump chamber 380 may have a first port 390 and a second port 400. The first port 390 may be in communication with the check valve assembly 270 while the second port 400 may be in communication with the air vent chamber assembly 280. The pump chamber 380 may be held in place by a chamber sleeve 410 and attached to the pump head housing 320 via a threaded pump cap 420. Other types of enclosures may be used herein. Other components and other configurations may be used herein.

Then angle of the piston 340 with respect to the sleeve 350 and the drive shaft 300 may be adjusted by the pin 360 or similar devices. As a result, the piston 340, the pump chamber 380, and the chamber sleeve 410 may be positioned at an offset from a vertical axis through the drive motor 290 as is shown in FIG. 5. The offset angle may vary from about three to about six degrees with a tolerance of less than about ±0.5°. About four degrees may be preferred. Depending upon the angle of the piston 340 and the speed of the drive motor 290, the volume of fluid pumped in each rotation of the piston 340 may vary. Moreover, the use of the flat area 370 causes the output of the nutating pump 260 to vary in the sinusoidal or trapezoidal fashion between pumping time and lull time in each rotation.

Figure 7:
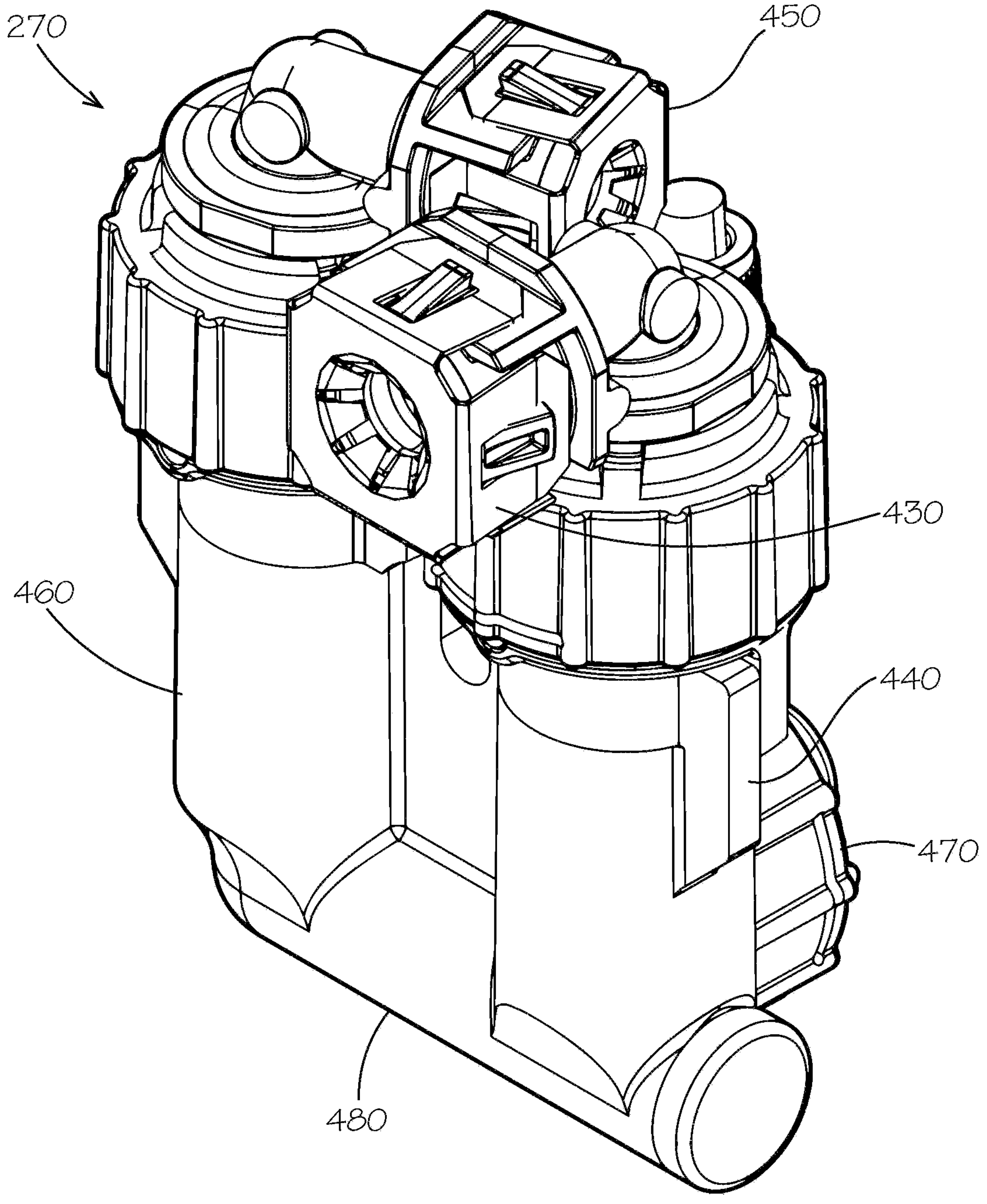
FIG. 7 is a perspective view of a check valve assembly of the micro-nutating pump of FIG. 2.
Figure 8:
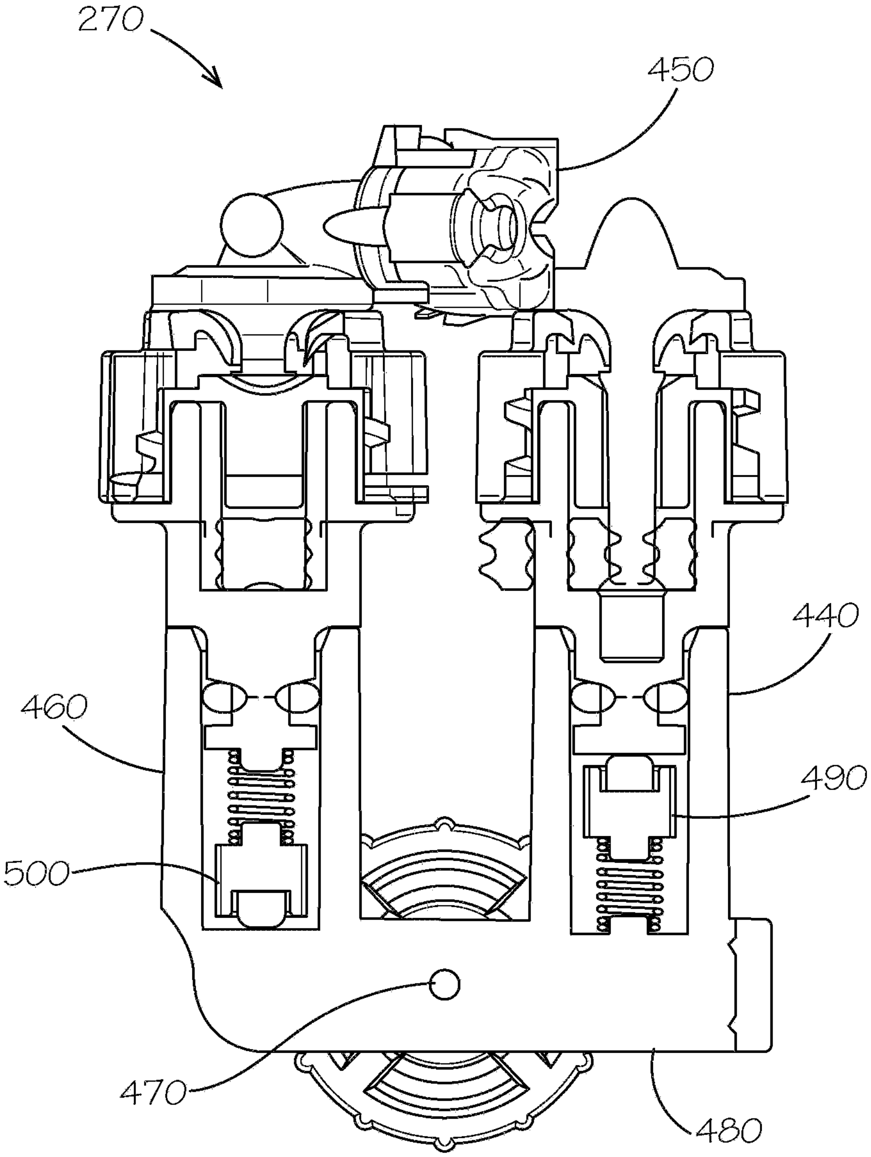
FIG. 8 is a cross-sectional view of the check valve assembly of FIG. 7.

FIGS. 7 and 8 show an example of the check valve assembly 270. The check valve assembly 270 may include an ingredient port 430 in communication with one of the micro-ingredient containers 130 and positioned on an ingredient chamber 440, a nozzle port 450 in communication with the nozzle 110 and positioned on a nozzle chamber 460, and a pump port 470 in communication with the nutating pump 260 and positioned on a pump chamber 480. The ingredient chamber 440 may have an ingredient chamber check valve 490 therein. The nozzle chamber 460 may have a nozzle chamber check valve 500 therein. The check valves 490, 500 may be conventional one way valves. The pump chamber 480 may be in communication with the ingredient chamber 440 and the nozzle chamber 460. Other components and other configurations may be used herein.

Depending on the drive direction of the nutating pump 260, micro-ingredients may be drawn from the micro-ingredient containers 130, into the ingredient port 430 and the ingredient chamber 440, into the pump chamber 480 and the pump port 470, and into the nutating pump 260. Alternatively in reverse, the micro-ingredients may be pumped by the nutating pump 260 into the pump port 470 and the pump chamber 460, into the nozzle chamber 460 and nozzle port 450, and on to the nozzle 110. The check valves 490, 500 may prevent any misdirected flows.

Figure 9:
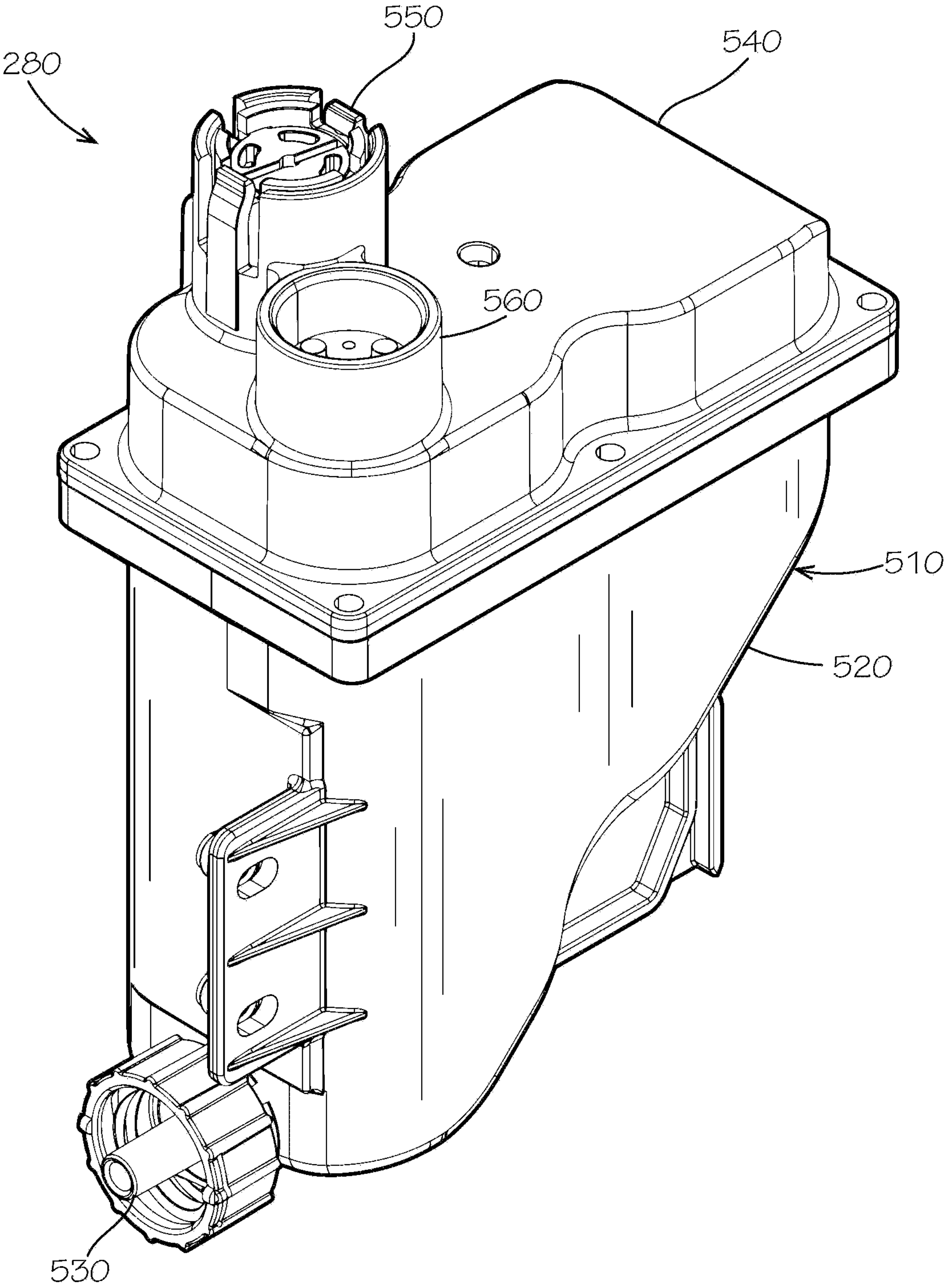
FIG. 9 is a perspective view of an air vent chamber assembly of the micro-nutating pump assembly of FIG. 2.
Figure 10:
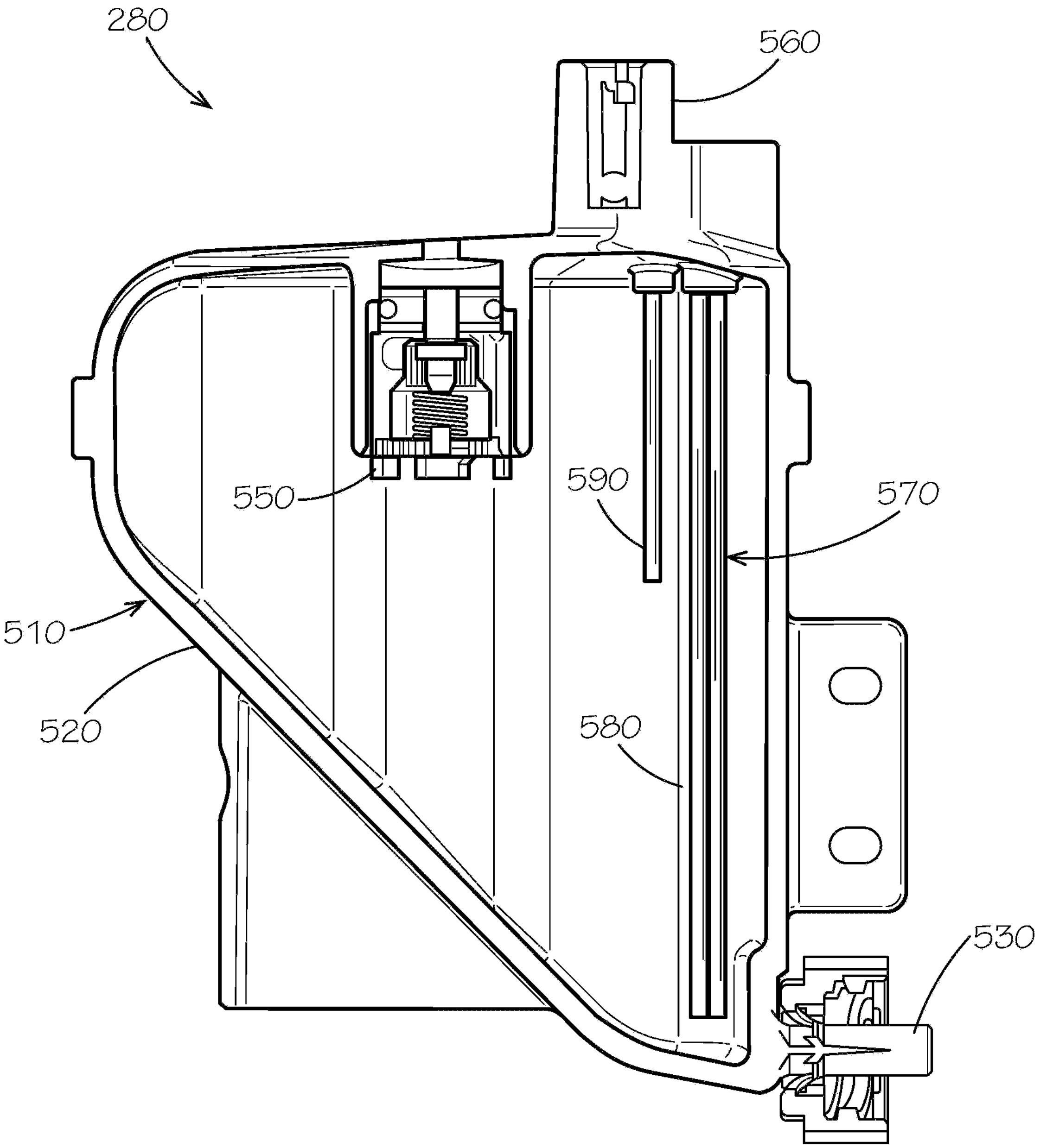
FIG. 10 is a cross-sectional view of the air vent chamber assembly of FIG. 9.
Figure 11:
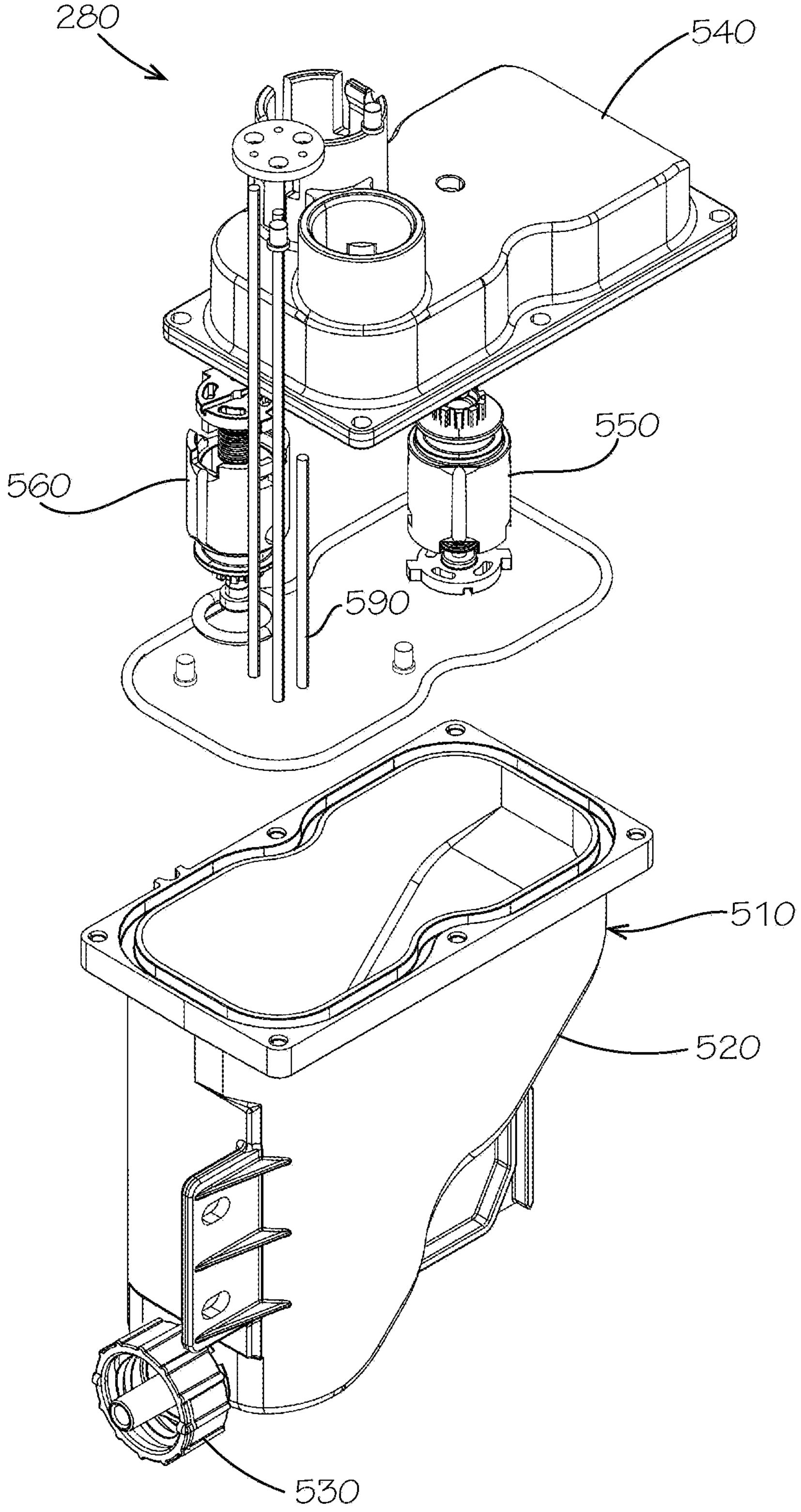
FIG. 11 is an exploded view of the air vent chamber assembly of FIG. 9.

FIGS. 9-11 show an example of the air vent chamber assembly 280. The air vent chamber assembly 280 may include an angled chamber 510 to hold the micro-ingredient therein. The angled chamber 510 may be sized to hold a sufficient volume of micro-ingredient for a number of pours, e.g., twenty pours or so. The angled chamber 510 may have an angled back wall 520. The back wall 520 may be positioned at an angle off of the horizontal of about 20 degrees to about 60 degrees with about 45 degrees preferred. The back wall 520 may have a number of agitators or other structures thereon so as to encourage a turbulent flow therein.

The angled chamber 510 may have air vent pump port 530 at the bottom thereof in communication with the pump port 470 of the nutating pump 260. The angled chamber 510 may be enclosed with a top lid 540. The top lid 540 may have an intake valve 550 and an overflow valve 560 thereon. The valves 550, 560 may be of conventional design. The intake valve 550 may be require a relatively large vacuum pressure to open, e.g., more than about seven psi or so. Specifically, the intake valve 550 may open only after a sanitation cycle or an overflow event so as recover headspace therein. An air filter may be included within intake valve 550. The intake valve 530 also may be used with a carbon dioxide line to prevent the intake of oxygen therein. The angled chamber 510 thus may remain largely sealed to prevent product degradation. The overflow valve 560 prevents overfilling the angled chamber 510. Other components and other configurations may be used herein.

The air vent chamber assembly 280 may include a number of level probes 570 positioned within the angled chamber 510. Specifically, the air vent chamber assembly 280 may include one or more low level probes 580 and one or more high level probes 590. The low level probes 580 may indicate a nearly empty angled chamber 510 and/or a sold out condition while the high level probes 590 may indicate that the angled chamber 510 is adequately filled. The nutating pump 260 may fill the angled chamber 510 until the fill level is indicated by the high level probes 590 and may draw down the angled chamber 510 until the low level probes 580 no longer contact the micro-ingredient therein. Other components and other configurations may be used herein.

Figure 12:
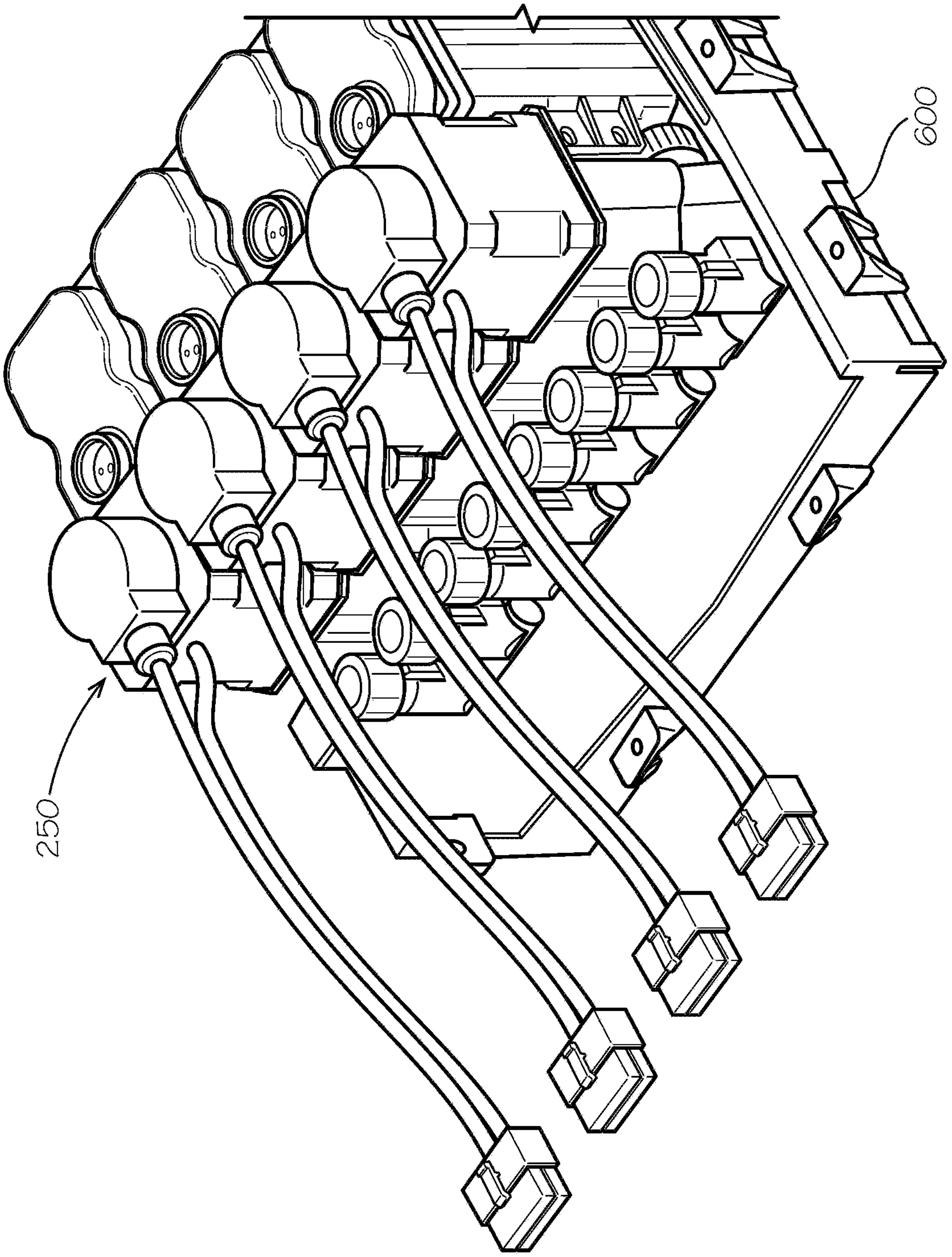
FIG. 12 is a perspective view of a number of nutating pump assemblies positioned on an agitation shelf.

FIG. 12 shows a number of micro-nutating pump assemblies 270 positioned on an agitation shelf 600. Because certain types of micro-ingredients require periodic agitation to prevent product separation, an agitation device may be used. In this example, an agitation shelf 600 provides reciprocating motion to agitate the micro-ingredients stored in the air vent chamber assemblies 280. Any type of reciprocating drive device may be used. Other types of agitation devices and agitation motions may be used herein.

In use, a micro-ingredient container 130 may be attached to the micro-nutating pump assembly 250 via the micro-ingredient conduit 145. The nutating pump 260 fills the air vent chamber assembly 280 with the micro-ingredient until the predetermined fill level is reach as determined by the high level probes 580. Priming of the micro-nutating pump assembly 250 may be avoided, even in the presence of air bubble in the lines, given the high torque of the nutating pump 260 and the use of the air vent chamber assembly 280. The use of the angled chamber 510 with the angled back wall 570 in the air vent chamber assembly 280 provides turbulence to promote good mixing of the micro-ingredients. Likewise, the agitation shelf 600 maintains good mixing therein.

The nutating pump 260 draws the micro-ingredient into the first port 390 as the flat area 270 of the piston 340 rotates thereabout and pushes the micro-ingredient out through the second port 400 as the rotation continues. The piston 340 may be maintained at a fixed angle while the speed of the drive motor 290 may vary. Specifically, the speed of the piston 340 may be faster on the pushing side as compared to the dwell side according to the sinusoidal or trapezoidal pumping pattern in the context of angular velocity with respect to time. The drive motor 290 drives the piston 340 in one direction to fill the air vent chamber assembly 280 and the reverse direction to forward a dose of the micro-ingredient to the nozzle 110. The use of a stepper motor as the drive motor provides for high accurate dosing control in a repeatable fashion.

The use of the low level probes 570 within the angled chamber 510 of the air vent chamber assembly 280 provides accurate yield management. Specifically, substantially all of the micro-ingredient in the micro-ingredient containers 130 may be evacuated therefrom, e.g., less than one percent may remain until a sold out condition is determined. The inability to refill the angled chamber 510 past the low level probes 580 indicates a sold out condition such that the control device indicates a need to replace the micro-ingredient container 130. The nutating pump 260 will continue to drain and refill the angled chamber 510 according to the low level probes 580 and the high level probes 590.

When cleaning the micro-nutating assembly 250, the micro-ingredient conduit 145 may be attached to a source of sanitizing solution and the like. The sanitizing solution may pass though the check valve assembly 270, the nutating pump 260, the air vent chamber assembly 280, and through the nozzle 110. Once refilled, the intake valve 530 may be pulled open to create sufficient headspace in the angled chamber 510. The intake valve 530 is normally only pulled open after refile or an overfill event to limit the intake of air therein.

The micro-nutating pump assembly 250 thus may be used to accurately dose highly concentrated and highly viscous fluids in a repeatable fashion. Moreover, the micro-nutating pump assembly 250 provides superior product management with little product waste, accurate sold out indications without false positives, and the ability of change over the micro-ingredient containers without priming. The micro-nutating pump assembly 250 thus makes the overall beverage dispenser system 100 more efficient and reliable. Although the micro-nutating pump assembly 250 has been described in the context of beverage dispensers, the micro-nutating pump assembly 250 and the components thereof may be used with any type of concentrated and/or viscous fluid requiring accurate dosing.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof

We claim:

1. A nutating pump assembly for pumping a fluid, comprising:
- a nutating pump;
- an air vent chamber assembly in fluid communication with the nutating pump; and
- wherein the air vent chamber assembly is positioned on an agitation shelf.

2. The nutating pump assembly of claim 1, wherein the nutating pump comprises a drive motor and a pump head.

3. The nutating pump assembly of claim 2, wherein the drive motor comprises a stepper motor.

4. The nutating pump assembly of claim 2, wherein the pump head comprises an adjustable coupling in communication with a piston.

5. The nutating pump assembly of claim 4, wherein the piston comprises a flat area thereon.

6. The nutating pump assembly of claim 4, wherein the piston comprises an offset position with respect to the drive motor.

7. The nutating pump assembly of claim 1, wherein the air vent chamber assembly comprises an angled chamber.

8. The nutating pump assembly of claim 7, wherein the angled chamber comprises a back wall positioned at an angle of about thirty degrees to about fifty degrees.

9. The nutating pump assembly of claim 1, wherein the air vent chamber assembly comprises one or more air vents thereon.

10. The nutating pump assembly of claim 1, wherein the air vent chamber assembly comprises one or more level probes therein.

11. The nutating pump assembly of claim 10, wherein the one or more level probes comprise a low level probe and a high level probe.

12. The nutating pump assembly of claim 1, further comprising a check valve assembly in communication with the nutating pump.

13. The nutating pump assembly of claim 1, wherein the check valve assembly comprises an incoming check valve and an outgoing check valve.

14. A method of pumping a fluid from a container to a nozzle, comprising:
- pumping the fluid by a nutating pump from the container to an air vent chamber assembly;
- storing the fluid within the air vent chamber assembly;
- agitating the fluid within the air vent chamber assembly;
- pumping the fluid by the nutating pump from the air vent chamber to the nozzle; and
- pumping more fluid by the nutating pump from the container to the air vent chamber assembly when the air vent chamber assembly is substantially empty.

15. A beverage dispensing system for dispensing a fluid, comprising:
- a fluid container;
- a nutating pump;
- an air vent chamber assembly;
- wherein the air vent chamber assembly comprises an angled chamber; and
- a nozzle;
- wherein the nutating pump pumps the fluid from the fluid container to the air vent chamber assembly and from the air vent chamber assembly to the nozzle.

16. The beverage dispenser system of claim 15, wherein the nutating pump comprises an adjustable coupling in communication with a piston.

17. The beverage dispenser system of claim 16, wherein the piston comprises a flat area thereon.

18. The beverage dispenser system of claim 15, further comprising a check valve assembly in communication with the nutating pump.

* * * * *